United States Patent [19]

Bures et al.

[11] 3,907,613
[45] Sept. 23, 1975

[54] PROTECTIVE COATINGS ON METALS AND ON THEIR ALLOYS

[75] Inventors: Jiri Bures; Vojtech Fic, both of Brno, Czechoslovakia

[73] Assignee: Zbrojovka Brno, narodni podnik, Brno, Czechoslovakia

[22] Filed: Mar. 20, 1973

[21] Appl. No.: 342,975

[52] U.S. Cl.............. 148/31.5; 117/75; 117/132 C
[51] Int. Cl.$^2$ .......................................... C23F 7/02
[58] Field of Search..... 260/47 ET; 117/132 C, 218, 117/75, 21; 148/6.15 Z, 6.16, 6.27, 31.5, 6.15 R; 204/38 A

[56] References Cited
UNITED STATES PATENTS

| | | | |
|---|---|---|---|
| 2,552,285 | 5/1951 | Knewstubb et al. | 204/38 A X |
| 3,272,664 | 9/1966 | Schlossberg et al. | 148/6.15 R X |
| 3,277,042 | 10/1966 | Richart | 148/6.15 R UX |
| 3,446,654 | 5/1969 | Barth et al. | 117/132 C X |
| 3,455,736 | 7/1969 | Davis et al. | 260/47 ET X |
| 3,471,587 | 10/1969 | Whittemore et al. | 117/132 C X |
| 3,484,351 | 12/1969 | Okada et al. | 260/47 ET X |
| 3,536,657 | 10/1970 | Noshay | 117/132 C X |

*Primary Examiner*—Ralph S. Kendall
*Assistant Examiner*—Charles R. Wolfe, Jr.

[57] ABSTRACT

Oxidized and/or phosphated conversion surface layer of metals and of metal alloys are charged by poly (2,6-dimethyl-1,4-phenylene oxide) or poly (2,6-dimethyl-1,4-phenylene oxide) containing resin. This resin can be modified by different kinds of resins or softeners and can furthermore contain corrosion inhibitors soluble in solvents of polyphenylene oxide, with further inert or protective material unsoluble in the used phenylene oxide resin anchored in the coating of phenylene oxide resin.

5 Claims, No Drawings

PROTECTIVE COATINGS ON METALS AND ON THEIR ALLOYS

BACKGROUND OF THE INVENTION

This invention relates to protective coatings on metals and on their alloys using resins comprising at least partially polyphenyleneoxide.

Poly(2,6-dimethyl-1,4-phenyleneoxide) is obtained by oxidizing polycondensation of 2,6 dimethylphenol. It is characterized by a high mechanical and chemical resistance and belongs therefore to the best constructional thermoplastics.

It is however unsuitable to create protective layers on metals, as the pure polyphenyleneoxide film loses after drying its adhesion with the basic material. In order to improve the adhesion, the metal surface is provided with a thin layer of copper or silver, which have a higher affinity to the polyphenyleneoxide. These methods of application of protective coatings are however cumbersome, generally also expensive and the final results are usually not very satisfactory.

SUMMARY OF THE INVENTION

It is an object of this invention to provide protective coatings on metals and their alloys, consisting of an oxidized conversion metal surface layer charged by the poly (2,6-dimethyl-1,4-phenylene oxide) resin.

According to the invention, the metal surface provided with an oxidized conversion surface layer of a thickness between 0.5 and 100 um is impregnated by a resin containing at least partly poly (2,6-dimethyl-1,4-phenylene oxide) in an amount of 1 to 250 g for 1 m$^2$ of the surface.

A further improvement of these protective coatings is achieved by modifying the poly (2,6-dimethyl-1,4-phenylene oxide) resin by silicon, epoxide, polyester resins and/or known softening agents of polyphenyleneoxide resin.

Another improvement of the protective coatings according to this invention is achieved by adding to the poly (2,6-dimethyl-1,4-phenylene oxide) or poly (2,6-dimethyl-1,4-phenylene oxide) containing resin a corrosion inhibitor and/or a mixture of known corrosion inhibitors, soluble in solvents of polyphenyleneoxide in an amount of 0.1 to 10 percent by weight.

Alternatively the protective coatings can receive a further layer of poly (2,6-dimethyl-1,4-phenylene oxide) containing resin of a thickness between 0.5 to 100 µm.

A very advantageous composition of the protective coating is achieved by anchoring in the layer of polyphenyleneoxide or polyphenyleneoxide containing resin further inert and/or protective materials in an amount up to 20 percent by weight of the used resin, which inert or protective materials are polyphenyleneoxide or polyphenyleneoxide containing resin.

A suitably oxidized surface of the metal or of the metal alloy is achieved by oxidation by heat, by alkaline oxidation, oxidation in water steam, by oxidation by a dark discharge, or by some other method. The oxide layers comprise microcrystalline metal compounds, which due to imperfections of the crystal lattice are reacting with reactive groups of chains of poly (2,6-dimethyl-1,4-phenylene oxide) and form with them rather strong chemical bonds. In addition a part of the poly (2,6-dimethyl-1,4-phenylene oxide) resin is bonded to the oxide physically. It is to be understood that from the poly (2,6-dimethyl-1,4-phenylene oxide) solution, to form the protective coating there is withdrawn only such an amount of resin as that stoichiometrically necessary to fill up the aforementioned chemical bond. The protective coatings according to this invention adhere well to the metal surface, they have a small friction coefficient, a high hardness, as well as a resistance to heat, chemical and mechanical influences. The preparation of protective coatings according to this invention is in comparison to actually used methods simple and relatively cheap.

A poly-(2,6-dimethyl-1,4-phenylenoxide) of any molecular weight is suitable for forming coatings according to this invention. Polymers of middle or low molecular mass, advantageously 20.000 to 60.000 are however most suitable for this purpose, possibly also mixtures of a polymer with high and low molecular mass, containing 0.5 to 40 % of low molecular polymer. Although coatings according to this invention made of pure poly (2,6-dimethyl-1,4-phenylene oxide) are sufficiently elastic, it is possible to soften the poly (2,6-dimethyl-1,4-phenylene oxide) resin by addition of suitable softening agents as for instance diphenyloxide, m-terphenyl, 4,4'-dibromodiphenyl, tetrachloro phtalanhydride and other known softening agent. Protective coatings according to this invention containing a softened poly (2,6-dimethyl-1,4-phenylene oxide) have of course somewhat worse properties than coatings of pure poly (2,6-dimethyl-1,4-phenylene oxide). It is also possible to use for preparation of coatings according to this invention a poly (2,6-dimethyl-1,4-phenylene oxide) modified by other materials such as polyamides, polyesters, epoxide and polyester resins and similar. According to results which have been obtained up to the present, coatings prepared from pure poly (2,6-dimethyl-1,4-phenylene oxide) have the best anticorrosive properties.

The protective coatings according to this invention can be achieved by any known process by immersion, spraying and/or other simple methods with an oxide conversion layer of bringing into contact a solution of poly (2,6-dimethyl-1,4-phenylene oxide) dissolved in known solvents or mixtures thereof.

EXAMPLES OF APPLICATION

1. A protective coating on construction steel is composed of an oxide film with 3 g/m$^2$ poly (2,6-dimethyl-1,4-phenylene oxide) resin having a molecular weight 60.000. This protective coating having a thickness of about 3 µm offers better corrosion resistance than a nickel layer having a thickness of 8 µm. The cost of a similar protective coating according to this invention is 98.7 percent less expensive than the of the nickel layer.

2. A protective coating on aluminium is composed of an oxide layer with 120 g/m$^2$ poly (2,6-dimethyl-1,4-phenylene oxide) resin of a molecular weight 30.000 modified by 20 percent by weight of polystyrene and 1 percent by weight of diphenyloxide. The protective coating having a thickness of 120 µm withstands heavy corrosion conditions.

The corrosion resistance of these layers can be furthermore improved by addition of a corrosion inhibitor, what proves particularly advantageous for protective coatings on iron and its alloys. All known types of corrosion inhibitors which are at least partly soluble in solvents capable to dissolve poly (2,6-dimethyl-1,4- phenylene oxide) are suitable for preparation of these coatings. This is for instance ammonium benzoate, triethanolamine, diphenylhydrazine and others. Corrosion inhibitors are according to this invention firmly anchored in the protective coating, they do not migrate. They are therefore effective even in small amounts.

It is possible to increase the resistance of protective coatings according to this invention for heavy corrosion conditions, particularly if the protective coatings should be permanently in contact with the corrosive medium, by applying another coating of poly (2,6-dimethyl-1,4-phenylene oxide) or poly (2,6-dimethyl-1,4-phenylene oxide) containing resin. Similar protective coatings offer higher corrosion resistance than coatings without this layer.

FURTHER EXAMPLES OF THE APPLICATION

3. A protective coating on construction steel is composed of an oxide layer with 4 g/m$^2$ poly (2,6-dimethyl-1,4-phenylene oxide) resin having a molecular weight 25.000 to 40.000, mixed with 1 percent by weight of triethanolamine. This coating of a thickness about 4 $\mu$m has better corrosion resistance than a nickel layer of a thickness 15 $\mu$m on the same construction steel.

4. The protective coating described in example 1, provided with another layer of pure poly (2,6-dimethyl-1,4-phenylene oxide) resin of a molecular weight 35.000 to 50.000 having an overall thickness of 7.5 $\mu$m is more than twice corrosion resistant than the coating according to example 1.

For preparation of these solutions of inert protective materials solvents are suitable, which do not solve or solve in a rather limited extent polyphenyleneoxide or polyphenyleneoxide containing resins. Such solvents are for instance paraffin hydrocarbons and oxocompounds, for instance paraffins, naphtenes, ethers, esters and the like. From inert or protective materials are equally suitable paraffin hydrocarbons, oils, stearine, waxes, fats, soaps, organometals, corrosion inhibitors, known conservation means, additions and their mixtures. It has been found that the application of an inert or protective layer on the coating with dried polyphenyleneoxide resin is little effective, as the protective material remains in its major part on the surface of the coating and a small amount only penetrates into the lower layers. A substantially larger amount of the protective material is introduced into the coating according to this invention by depositing a layer of an inert or, protective material on the not yet dried coating of polyphenyleneoxide resin for inst. ce by dipping into a solution of said material. The onsequence thereof is a subsequent substitution of the solvent in the polyphenyleneoxide by the protective material, which is thus introduced into the intermolecular spaces of the polyphenyleneoxide coating and which is therein after drying firmly anchored. It is thereafter impossible to remove the protective material without damaging the polyphenyleneoxide coating. The thus modified coating receives new functional properties, for instance selfgreasing, increased resistance against corrosion, abrasion, influence of heat and of chemical materials depending on what protective material is used for this modification.

Some of the large number of protective coatings according to this invention are described in the following:

EXAMPLE 5

Oxide or phosphate films on steel are impregnated by dipping into a 0.5 percent solution of polyphenyleneoxide modified by 5 percent by weight of polyoctaphenyltetrasiloxene in trichlorethylene. The created coating, still in wet condition is dipped in gasoline or kerosene, containing 5 percent by weight of fat, for instance tallow. Soaps, current chemical preservatives or preservating oils can be equally used. The thus prepared surfaces have a very good resisting against corrosion at an overall thickness 2 to 5 $\mu$m and good friction, heat and chemical properties.

EXAMPLE 6

An elox film on aluminium is inpregnated by a 1 percent solution of polyphenyleneoxide in trichlorethylene. The not yet dried coating is boiled for 10 minutes in a 5 percent aqueous solution of ammonium phosphite. The heat resistivity of the coating is improved by 20° to 30°C.

EXAMPLE 7

A chemically or electrochemically formed chromate film on copper or brass is immersed into a 2 percent solution of polyphenyleneoxide in trichlorethylene. The formed not yet dried layer is immersed for about 1 hour in a 10 percent suspension of molybdenum disulphide with powder polytetrafluorethylene in a ratio 1 to 1 by weight in a 1 percent solution of polystyrene in carbon disulphide. The created coating shows a very low friction coefficient and very good resistivity to abrasion.

EXAMPLE 8

Small steel components are after alkaline oxydation impregnated in mass by a 1 percent solution of polyphenyleneoxide in trichlorethylene. They are still wet transferred to a kerosene solution containing some organic nitrate corrosion inhibitor. Other inhibitors react alike. The dried components showed an at least ten times higher corrosion resistivity not only on surfaces but even on edges, in construction recesses and similar.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. A protective coating lying directly upon a metal, comprising a surface conversion layer of oxides of the metal, said surface layer having a thickness between 0.5 and 100 $\mu$m, said surface layer being impregnated with a poly (2,6-dimethyl-1,4-phenylene oxide) resin in an amount varying between 1 and 250 grams per square meter of the surface to be coated.

2. A protective coating as claimed in claim 1, wherein the poly (2,6-dimethyl-1,4-phenylene oxide) resin is modified by resins selected from the group comprising silicon, epoxide, polyester and polyamide resins, in an amount of up to 20 percent by weight of the poly (2,6-dimethyl-1,4-phenylene oxide) resin.

3. A protective coating as claimed in claim 1, wherein the poly (2,6-dimethyl-1,4-phenylene oxide) resin is modified by at least one softener.

4. A protective coating as claimed in claim 1, wherein the poly (2,6-dimethyl-1,4-phenylene oxide)

resin contains at least one corrosion inhibitor soluble in solvents for polyphenylene oxide, in an amount of from 0.1 to 10 percent by weight of the poly (2,6-dimethyl-1,4-phenylene oxide) resin.

5. A protective coating as claimed in claim 1, comprising an outer, additional layer of the poly (2,6-dimethyl-1,4-phenylene oxide), overlying the first recited surface layer, said additional layer having a thickness of from 0.5 to 100 µm.

* * * * *